United States Patent [19]

Harris et al.

[11] Patent Number: 5,672,662

[45] Date of Patent: Sep. 30, 1997

[54] POLY(ETHYLENE GLYCOL) AND RELATED POLYMERS MONOSUBSTITUTED WITH PROPIONIC OR BUTANOIC ACIDS AND FUNCTIONAL DERIVATIVES THEREOF FOR BIOTECHNICAL APPLICATIONS

[75] Inventors: J. Milton Harris; Antoni Kozlowski, both of Huntsville, Ala.

[73] Assignee: Shearwater Polymers, Inc., Huntsville, Ala.

[21] Appl. No.: 642,231

[22] Filed: Oct. 2, 1995

Related U.S. Application Data

[63] Continuation-in-part of Ser. No. 499,321, Jul. 7, 1995, abandoned.

[51] Int. Cl.$^6$ ............................ C08G 65/32; A61K 31/765
[52] U.S. Cl. ........................... 525/408; 525/409; 525/54.1; 525/61; 525/326.8; 564/475; 564/477; 560/198; 560/200; 560/230; 568/62; 568/623; 568/624; 568/625; 556/410; 556/412; 548/461; 548/462; 562/537; 562/538; 424/450; 424/179.1; 424/193.1; 424/94.1; 546/208; 546/243; 548/435; 548/465; 548/475; 548/520; 548/542; 530/402; 530/404; 530/405; 530/406; 530/408; 530/409; 530/410
[58] Field of Search ....................... 525/408, 409, 525/54.1, 61, 326.8; 564/475, 477; 560/198, 200, 230; 568/62, 623, 624, 625; 556/410, 412; 548/461, 462, 435, 465, 475, 520, 542; 562/537, 538; 424/450, 179.1, 193.1, 94.1; 546/208, 243; 530/402, 404–406, 408–410

[56] References Cited

U.S. PATENT DOCUMENTS

| | | | |
|---|---|---|---|
| 4,248,786 | 2/1981 | Batz et al. | 260/326.26 |
| 4,670,417 | 6/1987 | Iwasaki et al. | 514/6 |
| 4,943,626 | 7/1990 | McGrath et al. | 528/408 |
| 5,157,075 | 10/1992 | Kanai et al. | 525/54.1 |
| 5,256,819 | 10/1993 | Fried | 562/537 |
| 5,328,955 | 7/1994 | Rhee et al. | 525/54.1 |
| 5,446,090 | 8/1995 | Harris | 525/54.1 |
| 5,483,008 | 1/1996 | Sakurai et al. | 525/408 |

FOREIGN PATENT DOCUMENTS

| | | |
|---|---|---|
| 0 067 029 A2 | 12/1982 | European Pat. Off. . |
| MI92A2616 | 7/1992 | Italy . |
| WO92/01474 | 2/1992 | WIPO ............ A61K 39/44 |

OTHER PUBLICATIONS

Polymer Preprints, vol. 31, No. 2, 1990, Samuel Zalipsky et al., "Succinimidyl Carbonates of Polyethylene Glycol: Useful Reactive Polymers for Preparation of Protein Conjugates".

S. Zalipsky, "Synthesis of an End–Group Functionalized Polyethylene Glycol–Lipid Conjugate for Preparation of Polymer–Grafted Liposomes," *Bioconjugate Chemistry*, vol. 4, No. 4, pp. 296–299 (1993).

S. Zalipsky et al., "Facile Synthesis of α–Hydroxy–ω–Carboxymethylpolyethylene Oxide," *Journal of Bioactive and Compatible Polymers*, vol. 5, pp.227–231 (Apr., 1990).

Primary Examiner—Frederick Krass
Attorney, Agent, or Firm—Bell, Seltzer, Park & Gibson, P.A.

[57] ABSTRACT

Active esters of PEG acids and related polymers are provided that have a single propionic or butanoic acid moiety and no other ester linkages. These polymer acids have a half life in water of from about 10 to 25 minutes. For example, alpha-methoxy, omega-propionic acid succinimidyl ester of PEG ("methoxy-PEG-SPA") has a nearly ideal reactivity with amino groups on proteins and other biologically active substances. The half life of methoxy-PEG-SPA is about 16.5 minutes in water. The invention also provides conjugates with proteins, enzymes, polypeptides, drugs, dyes, nucleosides, oligonucleotides, lipids, phospholipids, liposomes, and surfaces of solid materials that are compatible with living organisms, tissue, or fluid.

25 Claims, No Drawings

POLY(ETHYLENE GLYCOL) AND RELATED POLYMERS MONOSUBSTITUTED WITH PROPIONIC OR BUTANOIC ACIDS AND FUNCTIONAL DERIVATIVES THEREOF FOR BIOTECHNICAL APPLICATIONS

This application is a continuation-in-part of and claims the benefit of the filing date of U.S. Ser. No. 08/499,321, which was filed on Jul. 7, 1995 and is entitled POLY (ETHYLENE GLYCOL) AND RELATED POLYMERS SUBSTITUTED WITH FATTY ACIDS AND FUNCTIONAL DERIVATIVES THEREOF FOR BIOTECHNICAL APPLICATIONS, now abandoned.

FIELD OF THE INVENTION

The invention relates to derivatives of poly(ethylene glycol) and related hydrophilic polymers, to methods for their synthesis, and to surfaces and molecules modified by these polymers for biotechnical use.

BACKGROUND OF THE INVENTION

Chemical attachment of the hydrophilic polymer poly(ethylene glycol) ("PEG"), which is also known as poly(ethylene oxide) ("PEO"), to molecules and surfaces is of great utility in biotechnology. In its most common form, PEG is a linear polymer terminated at each end with hydroxyl groups:

HO—CH$_2$CH$_2$O—(CH$_2$CH$_2$O)$_n$—CH$_2$CH$_2$—OH

The above polymer, alpha-, omega-dihydroxyl poly(ethylene glycol) can be represented in brief form as HO-PEG-OH where it is understood that the -PEG- symbol represents the following structural unit:

—CH$_2$CH$_2$O—(CH$_2$CH$_2$O)$_n$—CH$_2$CH$_2$—

As an example of biotechnical applications of PEG, some active derivatives of PEG have been attached to proteins and enzymes with beneficial results. PEG is soluble in organic solvents. PEG attached to enzymes can result in PEG-enzyme conjugates that are soluble and active in organic solvents. Attachment of PEG to protein can reduce the immunogenicity and rate of kidney clearance of the PEG-protein conjugate as compared to the unmodified protein, which may result in dramatically increased blood circulation lifetimes for the conjugate.

PEG attached to surfaces can reduce protein and cell adsorption to the surface and alter the electrical properties of the surface. Similarly, PEG attached to liposomes can result in a great increase in the blood circulation lifetime of these particles and thereby possibly increase their utility for drug delivery. The above applications and many leading references are described in the book by Harris (J. M. Harris, Ed., "Biomedical and Biotechnical Applications of Polyethylene Glycol Chemistry," Plenum, New York, 1992).

Chemically active or "activated" derivatives of the PEG polymer are prepared to attach the PEG to molecules and surfaces. A number of such derivatives have been prepared, some of which are of somewhat general utility, some of which are directed to solving specific problems associated with particular applications, and some of which have not proved useful or have problems that limit their usefulness. For example, active esters of alpha-, omega-dicarboxylic acids of PEG have been prepared, typically for attachment of PEG to amino groups. An example of such an active ester is poly(ethylene glycol) di-succinimidyl succinate (symbolized in shorthand as "SS-PEG-SS"):

HO$_2$C—CH$_2$CH$_2$—CO$_2$—PEG—O$_2$C—CH$_2$CH$_2$—CO$_2$—H+
2NHS—OH→→NHS—O$_2$C—CH$_2$CH$_2$—CO$_2$—PEG—O$_2$C—CH$_2$CH$_2$—CO$_2$—NHS SS-PEG-SS

The symbol NHS is shorthand for N-hydroxy succinimide, from which the succinimidyl active ester moiety is derived. In the remaining chemical drawings the N-hydroxylsuccinimide active ester moiety will be represented as —CO$_2$—NHS.

The SS-PEG-SS active ester reacts rapidly with amino groups on proteins and other molecules to form a stable amide linkage (—CO—NH—). However, a problem with the active ester is that SS-PEG-SS possesses ester linkages in the backbone that remain intact after coupling to an amine such as a protein (represented as PRO-NH$_2$):

SS-PEG-SS+2PRO-NH$_2$→→PRO—NHCO—CH$_2$CH$_2$—CO$_2$—PEG—O$_2$C—CH$_2$CH$_2$—CONH—PRO

The intact ester linkage that remains after the protein and PEG conjugate is formed is subject to hydrolysis. The PEG detaches from the modified protein in aqueous solution. The rate at which hydrolysis occurs can vary with the environment.

U.S. Pat. No. 4,670,417 discloses hemoglobin modified with various dicarboxylic acid PEGs in which the ester linkage that would otherwise remain in the conjugate is replaced with an ether linkage. The hemoglobin is modified in the presence of amino acids or amines that are said to also react with the dicarboxylic acid PEG to prevent excessive carboxyl groups from reacting with the hemoglobin, to avoid crosslinking and gelation of the reaction mixture, and to avoid the time, expense, and use of large reaction vessels that would otherwise be required. Thus, special precautions are necessary to prevent cross linking with this difunctional material.

PEGs that are activated at each terminus with the same reactive moiety, such as the activated dicarboxylic acid PEGs discussed above, have been referred to in the art as being "homobifunctional" to indicate that the active moieties at the polymer ends are normally the same. There is also much interest in PEG derivatives in which different functional groups are present at the two terminae of the polymer chain. These derivatives are sometimes referred to as heterobifunctional or heterofunctional.

Zalipsky and Barany in *J. of Bioactive and Compatible Polymers*, 5, 227–231 (1990) describe preparation of the following heterofunctional PEG in which the polymer has a carboxymethyl group at one terminus and a hydroxyl group at the other terminus:

HO—PEG—O—CH$_2$CO$_2$—H

Both hydroxyl and carboxymethyl groups in the above molecule can be "activated" for subsequent reaction by conversion to other forms. For example, Zalipsky in *Bioconjugate Chemistry*, 4, 296–299 (1993) describes preparation of the following heterofunctional PEG in which the hydroxyl terminus has been converted to the succinimidyl carbonate and the carboxyl terminus has been converted to a complex structure referred to as a t-Boc-protected hydrazide:

NHS—O$_2$C—O—PEG—CONH—CH$_2$CO—NH—NH—CO$_2$—C(CH$_3$)$_3$

The above derivative is proposed for attaching aminophosolipids to the succinimidyl carbonate, followed by removal of the t-Boc protecting group, to give PEG-phospholipids with a reactive hydrazide group remaining at the PEG terminus.

PEG derivatives active on one end and capped on the opposite end by a relatively nonreactive methoxy group have been prepared. These mPEGs are typically considered to be monofunctional, so that only one end of the PEG is active for conjugation to other substances. For example, one PEG is frequently used in a form in which there is a relatively nonreactive methoxy group at one terminus and the reactive succinimidyl succinate group at the other terminus:

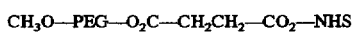

It is desirable in the biotechnical arts to continually develop activated polymers suitable for conjugation with one or more of various substances including proteins, lipids, liposomes, drugs, surfaces, and ligands for two-phase partitioning. With the foregoing in mind, it is an object of the invention described below to provide additional such activated PEGs.

SUMMARY OF THE INVENTION

The invention is based upon the recognition that many of the activated carboxylic acid PEGs have poor reactivity and are either too slow or too fast to be generally useful for conjugation. For example, the NHS ester of carboxymethylated PEG is so reactive that it hydrolyzes almost immediately upon solution in water. This high reactivity is a serious deficiency of PEG derivatives based on carboxymethylated PEG.

The invention provides heterofunctional and monofunctional PEGs and related polymers having a single carboxylic acid moiety of suitable reactivity, which can be activated. The active esters of these polymer acids have a single active ester and no other ester linkages. The active esters have a half life in water of from about 10 to 25 minutes. These esters include either a propionic or butanoic acid moiety and a polymer such as PEG or a related polymer. These related polymers include poly(alkylene oxides), poly(oxyethylated polyols), poly(olefinic alcohols), and poly(acrylomorpholine).

Also provided in accordance with the invention are conjugates of these activated polymers with biologically active substances such as polypeptides, proteins, enzymes, phospholipids, lipids, liposomes, nucleosides, oligonucleotides, drugs, dyes, and the surfaces of solid materials that are compatible with living organisms, tissue, or fluids, which are sometimes referred to as biomaterials. Further provided are methods for preparation of these activated polymers and conjugates.

In one embodiment, one terminus of PEG is the activated propionic acid or butanoic acid moiety and the other terminus can be capped with a relatively nonreactive methoxy group, for example, or can be activated with any other functional group, which may be protected or unprotected. For example, the succinimidyl ester of heterofunctional PEG propionic acid can be represented as follows:

In the above example, "X—" can include any activating group other than a carboxylic acid or activated carboxylic acid or can be a relatively nonreactive group such as methoxy, $CH_3O$—. For example, "X—" can include the thiol-selective vinyl sulfone and other sulfone moieties as shown in commonly assigned U.S. Pat. No. 5,446,090, which issued on Aug. 29, 1995, the contents of which are incorporated herein by reference.

The utility of the heterofunctional and monofunctional propionic and butanoic acid PEGs is believed to come from four sources. First, the succinimidyl ester of PEG propionic acid has ideal reactivity for attachment to amines, such as proteins, in aqueous solution. The succinimidyl ester of PEG butanoic acid is less reactive than the propionic acid, but is still of utility. Second, the reactions at the terminae of the heterofunctional and monofunctional PEG molecules can be controlled to limit cross linking generally more easily than typically is true of homobifunctional derivatives. Third, the hydrolytic stability of the ether linkages in the backbone of PEG propionic acid results in stable conjugates after chemical coupling to another molecule or surface. Fourth, the hydrolytic stability of the ether linkage in the intermediate heterofunctional and monofunctional propionic acid PEGs permits ready purification of the intermediate by ion exchange chromatography in aqueous medium.

The structure of the active esters of poly(ethylene glycol) of the invention can be represented as follows:

R—(OCH$_2$CH$_2$)$_n$—Z—(CH$_2$)$_m$—CO$_2$—Q

The moiety (OCH$_2$CH$_2$)$_n$ represents PEG wherein n is from about 20 to 4000. More typically, n is from 20 to 2000. Z is selected from hydrolytically stable groups including —O—, —S—, —NHCO—, —CONH—, —NHCO$_2$—, and —O$_2$CNH—. The value of m is from 2 to 3 for propionic and butanoic acid derivatives, respectively. Q is selected from the group including hydrogen, tert-butyl, N-succinimide, N-sulfosuccinimide, N-phthalimide, N-glutarimide, N-tetrahydrophthalimide, N-norbornene-2,3-dicarboximide, hydroxybenzotriazole, and hydroxy-7-azabenzotriazole. R is selected from the group including hydrogen, aldehyde, acetal, alkyl, benzyl, aryl, alkenyl CH$_2$=CH—CH$_2$—, acrylate CH$_2$=CH—CO—, methacrylate CH$_2$=C(CH$_3$)—CO—, acrylamide CH$_2$=CH—CONH—CH$_2$CH$_2$—, active sulfone, amine H$_2$N—CH$_2$CH$_2$—, and protected amine Y—NH—CH$_2$CH$_2$— (where Y is any of several amine protecting groups well known in the art and including, for example, t-Boc), thiol HS—CH$_2$CH$_2$—, and protected thiol B—S—CH$_2$CH$_2$— (where B is any of several thiol protecting groups well known in the art and including, for example, orthopyridyldisulfide).

Thus, the invention provides active esters that have suitable reactivity for modification of other molecules and surfaces. Use of these active esters to prepare PEG-proteins, PEG-surfaces, and PEG-phospholipids is described.

DETAILED DESCRIPTION OF THE INVENTION

The following examples are given to illustrate the invention, but should not be considered in limitation of the invention:

Example 1—Synthesis of CH$_3$O—(CH$_2$CH$_2$O)$_n$—CH$_2$CH$_2$CO$_2$—NHS

Example 2—Synthesis of CH$_3$O—(CH$_2$CH$_2$O)$_n$—CH$_2$CH$_2$—S—CH$_2$CH$_2$CO$_2$—NHS Example 3—Synthesis of CH$_3$O—(CH$_2$CH$_2$O)$_n$—CH$_2$CH$_2$CH$_2$CO$_2$—NHS Example 4—Rates of hydrolysis of PEG-NHS active esters Example 5—Synthesis of HO—(CH$_2$CH$_2$O)$_n$—CH$_2$CH$_2$—S—CH$_2$CH$_2$—CO$_2$H Example 6—Synthesis of HO—(CH$_2$CH$_2$O)$_n$—CH$_2$CH$_2$—S—CH$_2$CH$_2$—CO$_2$—NHS Example 7—Synthesis CH$_2$=CH—CO$_2$(CH$_2$CH$_2$O)$_n$CH$_2$CH$_2$—S—CH$_2$CH$_2$CO$_2$—NHS Example 8—Synthesis CH$_2$=CHCH$_2$O—(CH$_2$CH$_2$O)$_n$CH$_2$CH$_2$S —CH$_2$CH$_2$CO$_2$NHS Example 9—Synthesis of HO—(CH$_2$CH$_2$O)$_n$—CH$_2$CH$_2$O)$_n$—NHCOCH$_2$CH$_2$CO$_2$C (CH$_3$)$_3$ Example 10—Synthesis of H$_2$N—(CH$_2$CH$_2$O)$_n$CH$_2$CH$_2$—S—CH$_2$CH$_2$CO$_2$H Example 11—Synthesis of HO—(CH$_2$CH$_2$O)$_n$—CH$_2$CH$_2$CO$_2$H Example 12—Synthesis of H$_2$N—CH$_2$CH$_2$O(CH$_2$CH$_2$O)$_n$—CH$_2$CH$_2$CO$_2$H Example 13—Synthesis of (CH$_3$)$_3$C—O—CONH—(CH$_2$CH$_2$O)$_n$—S —CH$_2$CH$_2$COOH Example 14—Synthesis of (CH$_3$)$_3$C—O—CONH—(CH$_2$CH$_2$O)$_n$—CH$_2$CH$_2$COOH Example 15—α-methoxy-ω-dipalmitoylphosphatidylethanolamide of propionic acid of PEG (a "PEG-phospholipid")

Example 16—α-methoxy-ω-distearoylphosphatidylethanolamide of propionic acid of PEG (a "PEG"-phospholipid)

Example 17—Synthesis of HS—CH$_2$CH$_2$CONH—(CH$_2$CH$_2$O)$_n$—CH$_2$CH$_2$—S—CH$_2$CH$_2$CO$_2$H Example 18—Coupling of methoxy-PEG-SPA to glass surfaces Example 19—Coupling of PEG-SPA to proteins

EXAMPLE 1 alpha-methoxy, omega-propionic acid succinimidyl ester of PEG ("methoxy-PEG-SPA")

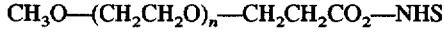
CH$_3$O—(CH$_2$CH$_2$O)$_n$—CH$_2$CH$_2$CO$_2$—NHS

A mixture of methoxy-PEG (or M-PEG-OH) of molecular weight 5000 (25.0 g), distilled water (25.0 ml) and potassium hydroxide (0.5 g) was cooled to 0°–5° C. in an ice bath. Acetonitrile (3.4 g) was added slowly, and the solution was stirred for 2.5 hours at 0°–5° C. The pH of the solution was adjusted to 7 by addition of sodium phosphate. The product was extracted with dichloromethane (200, 70 and 50 ml). The organic layer was dried over magnesium sulfate, diethylether. The precipitate was removed by filtration and dried under vacuum. Yield of PEG nitrile 23.5 g. NMR (d$_6$-DMSO): 2.74 ppm (t, 4H, —CH$_2$—CN); 3.21 ppm, (s, —OCH$_3$), 3.50 ppm (s, —OCH$_2$CH$_2$O—).

A mixture of M-PEG nitrile from the above step (23.5 g) and concentrated hydrochloric acid (117.5 g) was stirred at, room temperature for 48 hours. The solution was diluted with one liter of water and extracted with dichloromethane (200, 150, and 100 ml). The combined organic extracts were washed twice with water, dried over sodium sulfate, filtered, and concentrated to dryness by rotary evaporation. Yield of PEG amide 21.5 g. NMR (d$_6$-DMSO): 2.26 ppm (t, 4H, —CH$_2$—CONH$_2$); 2.43 ppm (t, 4H, —CH$_2$—COOH); 3.21 ppm (s, —OCH$_3$), 3.50 ppm (s, —OCH$_2$CH$_2$O—).

M-PEG amide from the above step (16.0 g) was dissolved in 1150 ml of distilled water, 100 g of potassium hydroxide was added, and the solution was stirred for 22 hours at room temperature. Sodium chloride (150 g) was added, and the solution was extracted with dichloromethane (150 ml×3). The combined organic extracts were washed with 5% oxalic acid, water (twice), and dried over sodium sulfate. The solution was concentrated and the product precipitated by addition to diethylether. The product M-PEG propionic acid was collected by filtration and dried over vacuum. Yield of acid 14.0 g. NMR (d$_6$-DMSO): 2.43 ppm (t, 4H, —CH$_2$—COOH); 3.21 ppm (s, —OCH$_3$), 3.50 ppm (s, —OCH$_2$CH$_2$O—).

M-PEG propionic acid (3.4 g, 1 mmol) was dissolved in dichloromethane (20 ml) and N-hydroxysuccinimide (2.1 mmol) was added. The solution was cooled to 0° C., a solution of dicyclohexylcarbodiimide (2.1 mmol) in 4 ml dichloromethane was added dropwise, and the solution was stirred at room temperature overnight. The reaction mixture was filtered, concentrated, and precipitated by addition to diethylether. Yield of final product: 3.3 g. NMR (d$_6$-DMSO): 2.81 ppm (s, 8H, NHS); 2.92 ppm (t, 4H, —CH$_2$—COO—); 3.21 ppm, (s, —OCH$_3$), 3.5 ppm (s, —OCH$_2$CH$_2$O—).

EXAMPLE 2 alpha-methoxy, omega-thiopropionic acid succinimidyl ester of PEG

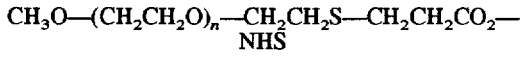
CH$_3$O—(CH$_2$CH$_2$O)$_n$—CH$_2$CH$_2$S—CH$_2$CH$_2$CO$_2$—NHS

In a round bottom flask equipped with a magnetic stir bar, reflex condenser and nitrogen line, M-PEG-5000-methanesulfonate (from Shearwater Polymers, 70.0 g; 0.0206 moles) was added to a mixture of 280 ml toluene and 420 ml absolute ethanol and stirred to dissolve. Sodium hydroxide (3×excess; 2.3 g; 0.058 moles) was dissolved in 56 ml absolute ethanol and added to the PEG-mesylate. Ethyl-3-mercaptopropionoate (3×excess; 7.84 ml; 8.15 g; 0.061 moles) was added to the reaction via syringe and the reaction was heated under a nitrogen atmosphere to 60° C. for three hours. The reaction mixture was cooled to room temperature, filtered to remove insoluble salts and concentrated to about 250 ml under reduced pressure. This is added to 1200 ml cold diethyl ether, giving a pale yellow precipitate which is dried in vacuo overnight. Yield 70.0 g, NMR (DMSO-d$_6$) 2.63 ppm (m, SCH$_2$CH$_2$, 4H), 3.21 ppm, (s, —OCH$_3$), 3.50 ppm (s, PEG backbone, 304 H), 4.57 ppm (t, OH, 1H).

In an Erlenmeyer flask equipped with a magnetic stir bar, M-PEG-5000—S—CH$_2$CH$_2$—COOC$_2$H$_5$ from the preceding step (70.0 g; 0.0206 moles) was added to 840 ml distilled deionized water and stirred to dissolve. In a separate beaker, sodium hydroxide (1.4 g) was added to 35 ml distilled deionized water and stirred to dissolve. The sodium hydroxide solution was added to the PEG solution until the pH was 12–13. The solution was then stirred at room temperature for one hour. Oxalic acid was added to adjust the pH to 3. The solution was extracted with CH$_2$Cl$_2$ three times (200/200/200 ml). The extract was dried over Na$_2$SO$_4$/MgSO$_4$, filtered, concentrated under reduced pressure to about 150 ml and added to 1000 ml cold diethyl ether to precipitate the product. The product was dried in vacuo overnight. Yield: 61.6 g, 88%. $^1$HNMR(DMSO-d$_6$) 2.625 ppm (m, CH$_2$CH$_2$, 4H), 3.21 ppm (s, —OCH$_3$), 3.50 ppm (s, PEG backbone, 304 H).

In a round bottom flask equipped with a magnetic stir bar and a rubber septum attached to a nitrogen line and bubbler, M-PEG-5000-COOH from the preceding step (3.00 g; 0.8823 mmol), N,N' dicyclohexyl carbodiimide (1.5×excess; 0.2731 g; 0.001324 mmol) and N-hydroxysuccinimide (1.5× excess; 0.1523 g; 0.001324 mmol) were dissolved in 60.0 ml CH$_2$Cl$_2$. The flask was immersed in an ice bath and stirred overnight. The reaction mixture was filtered, concentrated under reduced pressure, filtered and precipitated into cold diethyl ether. Yield 2.50 g, 83%. $^1$HNMR (DMSO-d$_6$) 2.625 ppm (m, CH$_2$CH$_2$, 4H), 2.81 (s, succinimide, 4H), 3.21 ppm, (s, —OCH$_3$), 3.50 ppm (s, PEG backbone, 304 H).

EXAMPLE 3 alpha-methoxy, omega-butanoic acid succinimidyl ester of PEG

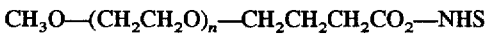
CH$_3$O—(CH$_2$CH$_2$O)$_n$—CH$_2$CH$_2$CH$_2$CO$_2$—NHS

Ethyl malonate (3.5 ml, 2 equivalents) dissolved in 100 ml of dioxane were added drop by drop to sodium hydride (0.674 g, 2 equivalents) and toluene (50 ml) in a round bottomed flask under nitrogen flow. M-PEG methanesulfonate (20 g, 1 equivalent, MW 5000 daltons, from Shearwater Polymers) was dissolved in 50 ml of toluene and added to the above mixture. The resulting mixture was reflexed overnight. The reaction mixture was then concentrated to half its original volume, extracted with 15 ml of 10% aqueous NaCl solution, extracted with 10 ml of 1% aqueous hydrochloric acid, and the aqueous extracts combined. The collected aqueous layers were extracted with dichloromethane (50 ml ×3), and the organic layer was dried with magnesium sulfate for 3 hours, filtered, and evaporated to dryness. Yield: 20 g of PEG malonic ester. NMR ($d_6$-DMSO): 1.17 ppm (t, 12H, —$CH_3$); 1.99 ppm (quartet, 4H, —$CH_2$—CH); 3.21 ppm, (s, —$OCH_3$); 3.5 ppm (s, —$OCH_2CH_2O$—); 4.10 ppm (quintet, 8H, —$OCH_2$—$CH_3$).

M-PEG malonic ester (18 g) was dissolved in 240 ml of 1N sodium hydroxide containing 12 g of sodium chloride, and the mixture was stirred for one hour. The pH of the mixture was adjusted to 3.0 by addition of 6N hydrochloric acid, and the mixture was extracted with dichloromethane (150 ml and 100 ml). The organic layer was dried over magnesium sulfate, filtered, concentrated, and poured into cold diethylether. The product M-PEG malonic acid was removed by filtration and dried under vacuum. Yield: 16 g. NMR ($d_6$-DMSO): 1.0 ppm (q, 4H, —$CH_2CH_2CH$); 2.90 ppm (t, 2H, —$CH_2CH$—); 3.21 ppm (s, —$OCH_3$); 3.5 ppm (s, —$OCH_2CH_2O$—); 12.1 ppm (s, 2H, —COOH).

M-PEG malonic acid (15 g) was dissolved in 120 ml of dioxane and refluxed for 8 hours, then concentrated to dryness. The residue was dissolved in 100 ml water, extracted with dichloromethane (70 ml and 50 ml), dried over magnesium sulfate, and the solution concentrated by rotary evaporation. The residue was precipitated by addition to cold diethyl ether. Yield: 11 g. NMR ($d_6$-DMSO): 1.72 ppm (quintet, 4H, —$CH_2CH_2CH_2$—COOH); 2.4 ppm (t, 4H, —$CH_2CH_2CH_2$—COOH); 3.21 ppm (s, —$OCH_3$); 3.37 ppm (t, 4H, —$CH_2CH_2CH_2$—COOH); 3.5 ppm (s, —$OCH_2CH_2O$—).

M-PEG butanoic acid (3.4 g, 1 mmol) was dissolved in dichloromethane (20 ml) and N-hydroxysuccinimide (2.1 mmol) was added. The solution was cooled at 0° C., a solution of dicyclohexylcarbodiimide (2.1 mmol) in 4 ml dichloromethane was added dropwise, and the solution was stirred at room temperature overnight. The reaction mixture was filtered, concentrated, and precipitated by addition to ethyl ether. Yield of final product: 3.3 g. NMR ($d_6$-DMSO): 1.83 ppm (quintet, 4H, —$CH_2CH_2CH_2$—COO—); 2.70 ppm (t, 4H, —$CH_2$—COO—); 2.81 ppm (8H, NHS); 3.21 ppm (s, —$OCH_3$); 3.5 ppm (s, —$OCH_2CH_2O$—).

EXAMPLE 4

RATES OF HYDROLYSIS OF PEG-NHS ACTIVE ESTERS

To determine the relative reactivities of the various PEG-NHS active esters, rates of hydrolysis were determined by using UV spectroscopy to monitor the formation of N-hydroxylsuccinimide at 290 nm. In a typical experiment, 7–10 mg of PEG-NHS ester was dissolved in 3.0 ml of 0.1 M phosphate buffer, pH 8.0, and the increase in absorbance at 290 nm was followed. A plot of log of absorbance at time zero minus absorbance at time t versus time yields a straight line of slope equal to the first order rate constant for hydrolysis. Division of this rate constant into 0.693 gives the half life for hydrolysis. All rates were performed in duplicate. Table 1 presents the half lives for hydrolysis of a series of PEG-NHS esters, including the new compounds prepared in this work as well as some known compounds. Additional experiments have shown that aminolysis rates parallel these hydrolysis rates.

TABLE 1

Hydrolysis half lives at pH 8, 25° C., for PEG-succinimidyl esters

| PEG NHS Ester | Symbol | half life (minutes)[b] |
|---|---|---|
| PEG-O-$CH_2CH_2CH_2$-$CO_2$-NHS | (1, SBA) | 23.3 |
| PEG-O-$CO_2$-NHS | (2, SC) | 20.4 |
| PEG-$O_2$C-$CH_2CH_2CH_2$-$CO_2$-NHS | (3, SG) | 17.6 |
| PEG-O-$CH_2CH_2$-$CO_2$-NHS | (4, SPA) | 16.5 |
| PEG-S-$CH_2CH_2$-$CO_2$-NHS | (5, SSPA) | 10.7 |
| PEG-$O_2$C-$CH_2CH_2$-$CO_2$-NHS | (6, SS) | 9.8 |
| PEG-$O_2$CNH-CH(Bu)-$CO_2$-NHS | (7, NOR) | 5.4 |
| PEG-$O_2$CNH-CH(R)-$CO_2$-NHS[a] | (8, PEG2) | 4.9 |
| PEG-NHCO-$CH_2CH_2$-$CO_2$-NHS | (9, SSA) | 3.2 |
| PEG-O-$CH_2$-$CO_2$-NHS | (10, SCM) | 0.75 |

[a]R = $CH_2CH_2CH_2CH_2$-$CO_2$-NHCO$_2$-PEG.
[b]As a rough rule of thumb the half life triples upon lowering pH one unit.

As shown in the table, SCM-PEG (10) has a half life of 0.75 minutes and reacts with water too quickly to be useful for conjugation with biologically active substances or surfaces. SS-PEG (6), with a half life of 9.8 minutes, has good reactivity, but contains an ester linkage and forms hydrolytically unstable conjugates. On the other hand, SSPA-PEG (5), which is prepared in accordance with the present invention, has good reactivity and no ester linkage that could interfere with hydrolytic stability of conjugates. SPA-PEG (4) has ideal reactivity at a half life of 16.5 minutes and no ester linkage that could interfere with hydrolytic stability. SBA-PEG (1) reacts more slowly, at a half life of 23.3 minutes, but still is of utility. Generally, a half life of 10 to about 20 or 25 minutes is desirable.

EXAMPLE 5

Synthesis of α-hydroxyl-ω-carboxyl-PEG

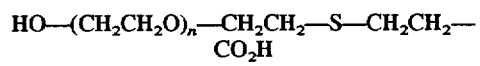

In a round bottom flask equipped with a magnetic stir bar, reflex condenser and nitrogen line, PEG-3400-methanesulfonate (70.0 g; 11% substituted; 0.0206 moles, Shearwater Polymers) was added to a mixture of 280 ml toluene and 420 ml absolute ethanol and stirred to dissolve. Sodium hydroxide (3×excess; 2.32 g; 0.0581 moles) was dissolved in 56 ml absolute ethanol and added to the PEG-mesylate. Ethyl-3-mercaptopropionate (3×excess; 7.84 ml; 8.15 g; 0.0607 moles) was added to the reaction via syringe and the reaction was heated under a nitrogen atmosphere to 60° C. for three hours. The reaction mixture is cooled to room temperature, filtered to remove insoluble salts and concentrated to about 250 ml under reduced pressure. This is added to 1200 ml cold diethyl ether, giving the desired ester as a pale yellow precipitate which is dried in vacuo overnight.

In an Erlenmeyer flask equipped with a magnetic stir bar, PEG ester from the preceding step (70.0 g; 0.0206 moles) was added to 840 ml distilled deionized water and stirred to dissolve. In a separate beaker, sodium hydroxide (1.4 g) was added to 35 ml distilled deionized water and stirred to dissolve. The sodium hydroxide solution was added to the PEG solution until the pH was 12–13. The solution was then stirred at room temperature for one hour. Oxalic acid was added to adjust the pH to 3. The solution was extracted with $CH_2Cl_2$ three times (200/200/200 ml). The extract was dried over $Na_2SO_4/MgSO_4$, filtered, concentrated under reduced pressure to about 150 ml and added to 1000 ml cold diethyl ether to precipitate the product. The product was dried in vacuo overnight. Yield: 61.6 g, 88%. The mixture was purified by ion exchange chromatography on Sepharose FF (Pharmacia). $^1$H-NMR (DMSO-$d_6$) 2.63 ppm (m, —$SCH_2CH_2$—, 4H), 3.50 ppm (s, PEG backbone, 304H), 4.57 ppm (t, OH, 1H).

EXAMPLE 6

Synthesis of α-hydroxy-ω-succinimidyl-PEG

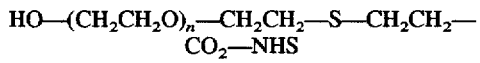
HO—$(CH_2CH_2O)_n$—$CH_2CH_2$—S—$CH_2CH_2$—$CO_2$—NHS

In a round bottom flask equipped with a magnetic stir bar and a rubber septum, attached to a nitrogen line and a bubbler, hydroxyl-acid from the preceding step (3.00 g; 0.882 mmol), N,N' dicyclohexyl carbodiimide (1.5×excess; 0.273 g; 0.00132 mmol) and N-hydroxysuccinimide (1.5×; 0.152 g; 0.00132 mmol) were dissolved in 60 ml $CH_2Cl_2$. The flask was immersed in an ice bath and stirred overnight. The next day the reaction mixture Was filtered, concentrated under reduced pressure, filtered and precipitated into cold diethyl ether. Yield 2.50 g, 83%. $^1$HNMR (DMSO-$d_6$) 2.625 ppm (m, $CH_2CH_2$,4H), 2.81 ppm, (s, succinimide, 4H), 3.50 ppm (s, PEG backbone, 304 H), 4.57 ppm (t, OH, 1H).

EXAMPLE 7

Synthesis of ω-succinimidyl-α-acryloyl PEG

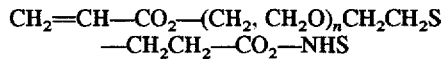
$CH_2$=CH—$CO_2$—$(CH_2, CH_2O)_n CH_2CH_2S$—$CH_2CH_2$—$CO_2$—NHS

In a round bottom flask equipped with a mechanical stir bar and a rubber saptum attached to a nitrogen line and a bubbler, ω-carboxyl-α-hydroxyl-PEG from Example 5 (1.00 g; 0.000294 moles) was dissolved in 30.0 ml dry $CH_2Cl_2$. Triethylamine (2.5×excess; 0.0744 g; 0.00103 moles) was weighed in a small test tube, diluted with 1 ml $CH_2Cl_2$ and added via syringe. Acryloyl chloride, 98% (2.5×excess; 0.0665 g; 0.00103 moles) was weighed in a small test tube, diluted with 1 ml $CH_2Cl_2$ and added via syringe. The reaction was stirred under nitrogen overnight. The mixture was concentrated under reduced pressure until slightly viscous and dripped into 80 ml cold diethyl ether to precipitate the product. After drying in vacuo three hours, the product was dissolved in distilled deionized water (100 ml) and stirred for 30 minutes. The aqueous solution was extracted in $CH_2Cl_2$ three times (30/30/20 ml). The extract was dried over $Na_2SO_4/MgSO_4$, concentrated under reduced pressure until slightly viscous, and dripped into 100 ml cold diethylether to precipitate the product. Yield: 0.946 g, 95%. $^1$H-NMR (DMSO-$d_6$) 2.625 ppm (m, $SCH_2CH_2$, 4H), 3.50 ppm (s, PEG backbone, 304 H), 5.96 ppm (dd, CHaHbCHcCOO, 1H), 6.20 ppm (dd, CHaHbCHcCOO, 1H), 6.35 pm (dd, CHaHbCHcCOO, 1H).

In a round bottom flask equipped with a magnetic stir bar and a rubber septum attached to a nitrogen line and a bubbler, this product (0.946 g; 0.278 mmol), N,N' dicyclohexyl carbodiimide (1.5×excess; 0.0861 g; 0.417 mmol) and N-hydroxysuccinimide (1.5×excess; 0.0480 g; 0.417 mmol) were dissolved in 30.0 ml $CH_2Cl_2$. The flask was immersed in an ice bath and stirred overnight. The next day the reaction mixture was filtered, concentrated under reduced pressure, filtered and precipitated into cold diethyl ether. Yield 0.592 g, 63%. $^1$H-NMR (DMSO-d6): 2.625 ppm (m, $SCH_2CH_2$, 4H), 2.81 ppm, (s, succinimide, 4H), 3.50 ppm (s, PEG backbone, 304 H), 5.96 ppm (dd, CHaHbCHcCoo, 1H), 6.20 ppm (dd, CHaHbCHcCOO, 1H), 6.35 ppm (dd, CHaHbCHcCOO, 1H). Hydrolysis, followed by titration of the resulting acid, indicated 2.49×10$^{-4}$ moles of acid per gram of PEG, or 85% of the theoretical value. FT-IR: 1783 cm$^{-1}$ C=O stretch, (succinimidyl ester end groups), 1114 cm$^{-1}$ C—O—C stretch.

EXAMPLE 8

Synthesis of α-allyl-ω-mercaptopropionic acid-PEG

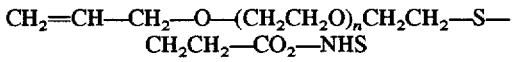
$CH_2$=CH—$CH_2$—O—$(CH_2CH_2O)_n CH_2CH_2$—S—$CH_2CH_2$—$CO_2$—NHS

In a three neck 1000 ml round bottom flask equipped with a magnetic stir bar, a Dean-Stark trap, a reflux condenser and a drying tube filled with $CaCl_2$, PEG 3400 (60.0 g; 0.0176 moles) was dissolved in 500 ml toluene. The mixture was azeotropically dried at 130 degrees C for approximately 20 minutes, such that 15–20 ml cloudy solution (solvent/water) collected in the Dean-Stark trap. After draining the Dean-Stark trap, the mixture was cooled to room temperature under nitrogen and 25% $CH_3ONa$ in methanol (4.03 ml; 0.0174 moles) was added via syringe. The reaction was heated to reflux and the methanol was collected in the Dean-Stark trap along with an additional 8 ml solvent. The reaction mixture was cooled under nitrogen to room temperature, during which time the color changed from pale yellow to deep red-brown. Allyl chloride (1.35 g; 1.43 ml; 0.00176 moles) was added via syringe and the mixture was stirred overnight at room temperature.

The following morning the mixture was filtered through a buchner funnel, concentrated under reduced pressure and precipitated into cold ether. Yield 49.17 g, 82%. The isolated product was checked by NMR to confirm that substitution had occurred. In a 500 ml two neck round bottom flask equipped with a magnetic stir bar, Dean-Stark trap, reflux condenser and drying tube filled with $CaCl_2$, allyl-PEG 3400 (49.17 g; 0.0144 moles) was dissolved in 250 ml toluene and azeotropically dried approximately 15 minutes to remove 15 ml cloudy solvent/water. After cooling under nitrogen to room temperature, distilled triethylamine stored over KOH (3×excess, 4.39 g; 6.05 ml; 0.0433 moles) was added via syringe followed by the addition of distilled methanesulfonyl chloride (3×excess; 4.97 g; 3.36 ml) and 35 ml dry $CH_2Cl_2$. The mixture was stirred at room temperature under nitrogen overnight. The next morning the mixture was concentrated under reduced pressure to remove the $CH_2Cl_2$, filtered through a glass frit and concentrated under reduced pressure to approximately 100 ml. The reaction mixture was placed in a 500 ml round bottom flask equipped with a magnetic stir bar and a reflux condenser fitted with a rubber septum. A small amount was isolated to confirm complete substitution by NMR. Three hundred ml absolute ethanol were added to the reaction mixture. Sodium hydroxide (4×excess; 2.77 g; 0.0692 moles) was dissolved in 60 ml absolute ethanol and added to the reaction mixture. Ethyl-3-mercaptopropionoate (4×excess; 9.31 g; 0.069 moles) was added to the flask via syringe and the reaction mixture was heated to 60° C. under nitrogen for three hours. The reaction mixture was then cooled to room temperature, filtered to remove insoluble salts, and concentrated under reduced pressure to approximately 150 ml. The viscous yellow syrup was dripped into 600 ml cold diethyl ether to precipitate a pale yellow product. Yield 44.58 g, 91%. Esterification was confirmed by NMR. After overnight drying under high vacuum, the product was placed in a 1000 ml Erlenmeyer flask equipped with a magnetic stir bar and dissolved in 550 ml distilled deionized water. Using a pH meter, 1.0M NaOH was added until the pH remained stable at 12. This process took approximately 1½ hours. The mixture was then acidified to pH 3.0 with oxalic acid, and extracted with $CH_2Cl_2$ (150/100/100) The extract was dried with $Na_2SO_4$/$MgSO_4$, concentrated under reduced pressure and dripped into 500 ml cold diethyl ether to precipitate the product. Yield 31.55 g, 71% $^1$HNMR (DMSO-$d_6$) 2.625 ppm (m, $SCH_2CH_2$, 4H), 3.50 ppm (s, PEG backbone, 304 H), 3.95 ppm (dd, $CH_2$=$CHCH_2O$, 2H), J=13 Hz, 5.13 ppm (dd, CHaHb=$CHcCH_2O$, 1H), J=13 Hz, 5.24 ppm (dd, CHaHb=$CHcCH_2O$, 1H), J=18 Hz, 5.88 ppm (dd, CHaHb=$CHcCH_2O$, 1H). FT-IR data: v 2879 cm$^{-1}$, C—H stretch (PEG).

In a 100 ml round bottom flask equipped with a magnetic stir bar, a rubber septum attached to a nitrogen line and a bubbler, α-allyl-ω-mercaptopropionic acid-PEG 3400 (2.052 g; 0.604 mmol), N,N' dicyclohexylcarbodiimide (1.5×excess, 0.187 g; 0.905 mmol) and N-hydroxysuccinimide (1.5×excess, 0.104 g; 0.905 mmol) were dissolved in 40 ml dry $CH_2Cl_2$. The flask was immersed in an ice bath and stirred overnight. The following day I the reaction mixture was filtered, concentrated under reduced pressure, filtered again and precipitated into 60 ml cold diethyl ether. Yield 1.075 g, 52% $^1$HNMR (DMSO-$d_6$) 2.625 ppm (m, $SCH_2CH_2$, 4H), 2.81 ppm (s, succinimide, 4H), 3.50 ppm (s, PEG backbone, 304 H), 3.95 ppm (dd, $CH_2CHCH_2O$, 2H), J=13 Hz, 5.13 ppm (dd, CHaHbCHcCH$_2$O, 1H), J=13 Hz, 5.24 ppm (dd, CHaHbCHcCH$_2$O, 1H), J=18 Hz, 5.88 ppm (dd, CHaHbCHcCH$_2$O, 1H). Chromatography gave an absorbance at 7.10 ml (14.2 min.) corresponding to the mono acid and a negative absorbance at 7.95 ml (15.9 min.) corresponding to a change in salt concentration for the buffer. An absorbance at 8.20 ml, (16.4 min.) corresponded to hydrolyzed N-hydroxysuccinimidyl ester. Titration data indicates, 2.69×10$^{-4}$ moles/gram PEG, 87.7% of the theoretical value. FT-IR data; v 2879 cm$^{-1}$, C—H stretch (PEG).

EXAMPLE 9 alpha-hydroxy, omega-tert-butyl ester of carboxyl PEG

HO—(CH$_2$CH$_2$O)$_n$—
CH$_2$CH$_2$NHCOCH$_2$CH$_2$COOC(CH$_3$)$_3$

A mixture of α-hydroxy-ω-amine of PEG of molecular weight 3400 (from Shearwater Polymers, 17 g, 0.00050 moles), tert-butyl hydrogen succinate (4.35 g, 0.025 moles, 5 fold molar excess), N,N-dicyclohexyl carbodiimide (5.16 g, 0.025 moles, 5 fold molar excess), and dichloromethane (100 ml) was stirred 16 hours at room temperature under nitrogen atmosphere. The mixture was filtered and solvent was distilled off under reduced pressure. The solid residue after distillation was dissolved in 400 ml distilled water and stirred overnight. Next the solution was filtered and the reaction product was extracted with dichloromethane (3×50 ml). The extract was dried with anhydrous sodium sulfate and added to 800 ml cold diethyl ether. The precipitated product was filtered off and dried under reduced pressure. Yield 15.8 g, 88.9% $^1$H NMR (DMSO-d6): 1.37 ppm,(s, (CH$_3$)$_3$C, 9H), 2.33 ppm (m,—OOC—CH$_2$CH$_2$—COO—, 4H), 3.50 ppm (s, PEG backbone, 304 H), 4.57 ppm (t, OH, 1H).

EXAMPLE 10 alpha-amino, omega-thiopropionic acid of PEG

H$_2$NCH$_2$CH$_2$O (CH$_2$CH$_2$O)$_n$CH$_2$CH$_2$—S—
CH$_2$CH$_2$CO$_2$H

PEG-3350-methanesufonate (from Shearwater Polymers 100.0 g; 0.0281 moles) was added to a mixture of 400 ml toluene and 300 ml absolute ethanol and stirred to dissolve. Ethyl-3-mercaptopropionate (6.0 g; 0.0445 moles. 79.2% of stoichiometric amount) and sodium hydroxide (1.6 g; 0.04 moles, 71.1% of stoichiometric amount) dissolved in 40 ml absolute ethanol were added to the reaction mixture. The reaction was heated under nitrogen atmosphere at 60° C. for three hours. The reaction mixture was cooled to room temperature, filtered to remove insoluble salt and concentrated to about 300 ml under reduced pressure. This is added to 1000 ml cold diethyl ether giving the white precipitate, which was dried in vacuo overnight.

The dried white precipitate was added to 180 ml distilled water and stirred to dissolve. The 1.0 M sodium hydroxide solution was added to above solution to adjust pH to 12. The solution was stirred at room temperature for two hours. The pH of the solution was maintained with periodical dropwise addition of 0.1 M sodium hydroxide. Next the solution was added to the mixture of 600 ml concentrated ammonium hydroxide and 60 g ammonium chloride and stirred 44 hours at room temperature. The reaction product (mixture of α,ω-diamino of PEG, α-amino-ω-thiopropionic acid of PEG, and α,ω-dithiopropionic acid of PEG) was extracted with dichloromethane (3×300 ml). The extract was dried over anhydrous magnesium sulfate, filtered and concentrated to dryness. Pure α-amino-hydrochloride-ω-thiopropionic acid of PEG was separated by ion exchange chromatography on S-Sepharose FF (Pharmacia). Yield 37.5 g. $^1$H NMR (DMSO-d6): 2.67 ppm (m, —CH$_2$—S—CH$_2$—, 4H), 2.96 ppm (t, —CH$_2$NH$_2$HCl, 2H), 3.50 ppm (s, PEG backbone, 304H).

EXAMPLE 11 alpha-hydroxy, omega-propionic acid of PEG

HO—(CH$_2$CH$_2$O)$_n$—CH$_2$CH$_2$CO$_2$H

A mixture of PEG of molecular weight 3350 (20.0 g; 0.00597 moles), distilled water (20.0 g) and potassium hydroxide (0.4 g) was cooled to 0.5° C. in an ice bath. Acrylonitrile (0.5 g; 0.00942 moles) was added slowly, and the solution was stirred 2 hours at 0°–5° C. Concentrated sulfuric acid (30.0 g) was added and the mixture was heated 3 hours at 95°–100° C. After cooling to room temperature distilled water (200 ml) was added, and the reaction product (mixture of unreacted PEG, α-hydroxy-ω-propionic acid of PEG, and dipropionic acid of PEG) was extracted with dichloromethane (3×30 ml). The extract was dried with anhydrous sodium sulfate, and solvent was distilled off under reduced pressure. Pure α-hydroxy-ω-propionic acid of PEG was separated by ion exchange chromatography on DEAE Sepharose FF (Pharmacia). Yield 7.2 g. $^1$H NMR (DMSO-d6): 2.43 ppm (t, —CH$_2$—COOH, 2H), 3.50 ppm (s, PEG backbone, 304 H), 4.57 ppm (t, OH, 1H).

EXAMPLE 12 alpha-amino, omega-propionic acid of PEG

H$_2$NCH$_2$CH$_2$O(CH$_2$CH$_2$O)$_n$CH$_2$CH$_2$CO$_2$H

A mixture of α-hydroxy-ω-propionic acid PEG of molecular weight 3400 from Example 11 (8.0 g, 0.00233 moles), methyl alcohol (90.0 ml), and concentrated sulfuric acid (0.55 ml) was stirred 1 hour at room temperature. Distilled water (50.0 ml) was added and calcium carbonate was used to adjust the pH of the mixture to 7. Methyl alcohol was distilled off under reduced pressure, and the reaction product α-hydroxy-ω-methyl ester of propionic acid of PEG was extracted with dichloromethane (3×30 ml). Next dichloromethane was distilled off under reduced pressure.

To the solution of α-hydroxy-ω-methyl ester of propionic acid of PEG (5.0 g, 0.00145 moles) in dichloromethane (30 ml) triethylamine (0.27 ml, 0.00193 moles, 133% of stoichiometric amount) and methanesulfonyl chloride (0.12 ml, 0.00155 moles, 107% of stoichiometric amount) were added and the resulting mixture was stirred overnight under nitrogen atmosphere. The mixture was filtered and solvent was distilled off under reduced pressure. The residue after distillation was dissolved in distilled water (50 ml) and 1M sodium hydroxide was added to adjust pH to 12. The solution was stirred at room temperature for one hour. The pH of the solution was maintained with periodical addition of 0.1N sodium hydroxide. Next the solution was added to the mixture of 160 ml concentrated ammonium hydroxide and 16 g ammonium chloride and stirred 46 hours at room temperature. The reaction product was extracted with dichloromethane (3×50 ml). The extract was washed with 20 ml 1 M hydrochloric acid, 20 ml distilled water and dried with anhydrous sodium sulfate. Next the solvent was distilled under reduced pressure giving 4.2 g of α-amine hydrochloride-ω-propionic acid of PEG. $^1$H NMR (DMSO-d6): 2.43 ppm (t, —CH$_2$—COOH, 2H), 2.96 ppm (t, —CH$_2$NH$_2$HCl, 2H), 3.50 ppm (s, PEG backbone, 304 H).

EXAMPLE 13 alpha-tert-butyloxycarbonylamino, omega-thiopropionic acid of PEG

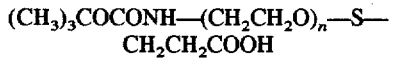
(CH$_3$)$_3$COCONH—(CH$_2$CH$_2$O)$_n$—S—CH$_2$CH$_2$COOH

A mixture of α-aminohydrochloride-ω-thiopropionic acid of PEG of molecular weight 3470 from Example 10 (17.4 g, 0.0050 moles), triethylamine (1.52 g, 0.0150 moles), di-tert-butyl dicarbonate (1.2 g, 0.0055 moles), and dichloromethane (100 ml) was stirred 16 hours at room temperature under nitrogen atmosphere. The solvent was distilled off under reduced pressure. The residue was dissolved in 200 ml distilled water, the pH of the solution was adjusted with 1 M HCl to 3, and the reaction product was extracted with dichloromethane (3×50 ml). The extract was dried with anhydrous sodium sulfate and added to 80 ml cold diethyl ether. The precipitated white product was filtered off and dried under reduced pressure. Yield 14.3 g, 80.9%. $^1$H NMR (DMSO-d6): 1.36 ppm (s, (CH$_3$)$_3$C—, 9H), 2.67 ppm (m, —CH$_2$—S—CH$_2$—, 4H), 3.15 ppm (q, —NHCH$_2$CH$_2$O—, 2H), 3.50 ppm (s, PEG backbone, 304 H), 6.76 ppm (t, —NH—, 1H).

EXAMPLE 14 alpha-tert-butyloxycarbonylamino, omega-propionic acid of PEG (CH$_3$)$_3$COCONH—(CH$_2$CH$_2$O)$_n$CH$_2$CH$_2$COOH A mixture of α-amino hydrochloride-ω-propionic acid of PEG of molecular weight 3460 from Example 12 (17.3 g, 0.0050 moles), triethylamine (1.52 g, 0.0150 moles), di-tert-butyl dicarbonate (1.2 g, 0.0055 moles), and dichloromethane (100 ml) was stirred 16 hours at room temperature under nitrogen atmosphere. The solvent was distilled off under reduced pressure. The residue was dissolved in 200 ml distilled water, the pH of the solution was adjusted with 1 M HCl to 3, and the reaction product was extracted with dichloromethane (3×50 ml). The extract was dried with anhydrous sodium sulfate, and added to 800 ml cold diethyl ether. The precipitated white product was filtered off and dried under reduced pressure. Yield 14.1 g. $^1$H NMR (DMSO-d6): 1.36 ppm (s, (CH$_3$)$_3$C—, 9H), 2.43 ppm (t, —CH$_2$COO—, 2H), 3.15 ppm (q, —NHCH$_2$CH$_2$O—, 2H), 3.50 ppm (s, PEG backbone, 304 H), 6.76 ppm (t, —NH—, 1H).

EXAMPLE 15

α-methoxy-ω-dipalmitoylphosphatidylethanolamide of propionic acid of PEG

α-Methoxy-ω-propionic acid succinimidyl ester of PEG of molecular weight 5170 from Example 1 (MSPA) (4.00 g, 0.000773 moles) was dissolved in chloroform (40 ml) and treated with solid dipalmitoylphosphatidyl-ethanolamine (DPPE) (0.60 g, 0.000867 moles) and triethylamine (0.70 ml). The suspension was vigorously mixed and maintained at 45° C. for 20 min. During this time a clear solution was formed. TLC (chloroform-methanol-water 90:18:2) showed complete disappearance of MSPA (Rf=0.73 I$_2$ vapor visualized) and formation of a new product (Rf=0.58, I$_2$ vapor visualized). Acetic acid (0.20 ml) and acetonitrile (112 ml) were added and the reaction mixture was cooled to 4° C. and then filtered and evaporated to dryness. The solid residue was dissolved in water and the pH of the solution was adjusted to 7.0 with 0.1N sodium hydroxide. The solution was transferred into Spectrapor nr 2 dialysis tubing (MWCO 12,000–14,000) and dialyzed against 50 mM saline solution 12 hours at 4° C., then two times against distilled water. Next the solution was lyophilized producing 3.3 g of white solid product. $^1$H NMR (CDCl$_3$): 0.88 ppm (t, CH$_3$—CH$_2$—, 6H), 1.26 ppm (s, CH$_3$, —(CH$_2$)$_{12}$—, 48H), 1.58 ppm (m, CH$_2$, 4H), 2.28 ppm (two overlapping t, CH$_2$—C=O, 6H), 3.36 ppm (m, —OCH$_2$—CH$_2$NH—, 2H), 3.64 ppm (s, PEG backbone, 304H), 3.94 ppm (m, —CH$_2$CH$_2$O—P, 2H), 4.17 ppm (dd, glycerol CH$_2$O—P, 2H), 4.39 ppm (dd, glycerol CH$_2$OOC—, 2H), 5.20 ppm (m, glycerol Ch, 1H) 7.60 ppm (t, NH, 1H).

EXAMPLE 16

α-methoxy-ω-distearoylphosphatidylethanolamide of propionic acid of PEG

α-Methoxy-ω-propionic acid succinimidyl ester of PEG of molecular weight 2170 (MSPA)(10 g, 0.00461 moles) was dissolved in chloroform (40 ml) and treated with solid distearoylphosphatidylethanolamine (DSPE) (3.72 g, 0.00497 moles) and triethylamine (2.4 ml). The suspension was vigorously mixed and maintained at 45° C. for 20 min. During this time a clear solution was formed. TLC (chloroform-methanol-water 90:18:2) showed complete disappearance of MSPA (Rf=0.73, I$_2$ vapor visualized) and formation of a new product (Rf=0.51, I$_2$ vapor visualized). Acetic acid (0.75 ml) and acetonitrile (160 ml) were added and the reaction mixture was cooled to 4° C. and then filtered and evaporated to dryness. The solid residue was dissolved in water and the pH of the solution was adjusted to 7.0 with triethylamine. The solution was transferred into Spectrapor dialysis tubing (hr. 2 dialysis tubing) (MWCO 12,000–14,000) and dialyzed against 50 mM saline solution 12 hours at 4° C., then two times against distilled water. Next the solution was lyophilized producing 9.2 g of white solid product. $^1$H NMR (CDCl$_3$): 0.88 ppm (t, CH$_3$—CH$_2$—, 6H), 1.26 ppm (s, CH$_3$—(CH$_2$)$_{14}$—, 56H), 1.58 ppm (m, CH$_2$, 4H), 2.28 ppm (two overlapping t, CH$_2$—C=O, 6H), 3.36 ppm (m, —OCH$_2$—CH$_2$NH—, 2H), 3.64 ppm (s, PEG backbone, 304H), 3.94 ppm (m, —CH$_2$CH$_2$O—P, 2H), 4.17 ppm (dd, glycerol CH$_2$O—P, 2H), 4.39 ppm (dd, glycerol CH$_2$OOC—, 2H), 5.20 ppm (m, glycerol CH, 1H), 7.60 ppm (t, NH, 1H).

EXAMPLE 17

Synthesis of HS—CH$_2$CH$_2$CONH—(CH$_2$CH$_2$O)$_n$—CH$_2$CH$_2$—S—CH$_2$CH$_2$CO$_2$H PEG amino acid (ω-aminohydrochloride-α-S-propionic acid, from Example 10) (1.83 grams) of molecular weight 4,000 was dissolved in 250 ml of benzene containing 1.0 ml of triethylamine and 20 ml of dry methylene chloride. Benzene was distilled off under reduced pressure. The residue was redissolved in 10 ml of acetonitrile, and succinimidyl-3-(2-pyridyldithio)propionate (SPDP) dissolved in 10 ml of acetonitrile was added. The mixture was stirred at room temperature under nitrogen atmosphere overnight. Gel permeation chromatography showed no aminoacid peak and a new monoacid peak. The solvent was distilled off under reduced pressure. Yield 3.2 g.

The product from the preceding step (3.2. g) was dissolved in 300 ml of distilled water containing 2.5 g of dithiothreitol and stirred at room temperature under nitrogen atmosphere for 3 hours. The reaction mixture was applied to a DEAE Sepharose FF column (100 ml), and the column was washed with 800 ml of distilled water. The product was eluted with 200 ml of 0.5 M NaCl. The pH of the eluate was adjusted to 3.0 with 0.1 M HCl, and the product was extracted with methylene chloride (3×40 ml). Next the solvent was distilled off. Yield 1.2 g. Gel permeation chromatograph showed 90% of the desired product, 8% dimer and 2% unknown impurity. $^1$H-NMR (d$_6$-DMSO): 2.25 ppm (t, —SH, 1H), 2.38 ppm (t, CH$_2$CONH, 2H), 2.51 ppm (t, CH$_2$COOH, 2H), 2.62 ppm (broad m, HS—CH$_2$—, —CH$_2$—S—CH$_2$—, 6H), 3.20 ppm (q, —CONHCH$_2$—, 2H), 3.51 ppm (s, polymer backbone, 36H), 7.97 ppm (t, NH, 1H).

EXAMPLE 18

Coupling of methoxy-PEG-SPA to glass surfaces

Quartz slides were cleaned and activated for surface modification by soaking in 1% (w/w) aqueous NaOH at 90° C. for 10 minutes, 3% (w/w) HCl at 90° C. for 10 minutes, and boiling in 30% (w/w) H$_2$O$_2$ for 1 hour to remove trace organics, then rinsed with water.

The clean glass slides were prepared for functionalization with aminopropylsilane by drying under vacuum of 10$^{-3}$ torr for 1 hour to remove excess surface water. The glass slides were then exposed to a 2% (v/v) solution of silane in anhydrous toluene for 4 hours at room temperature. The capillaries were rinsed with toluene and cured in a vacuum oven at 190° C., 10$^{-3}$ torr for 12 hours. This procedure gave quartz slides with available amino groups on the surface.

Methoxy-PEG-SPA from Example 1 (MW 5000) was grafted to the functionally activated quartz surfaces by reacting as 5% (w/v) solution in 0.05 M sodium bicarbonate (pH 8.3) for 4 hours at 40° C. After PEG immobilization, surfaces were rinsed with toluene, dried under vacuum and rinsed with water. Examination with X-ray photoelectron spectroscopy (XPS) showed the presence of a large C-O peak consistent with attachment of PEG. Also the water-contact angle is near zero, as expected for a PEG-coated surface. Finally, adsorption studies with fibrinogen revealed that fibrinogen adsorption on the PEG-coated surface has been reduced by approximately 98% relative to uncoated quartz.

EXAMPLE 19

Coupling of PEG-SPA to proteins

Succinimidyl esters of PEG propionic acids ("PEG-SPA") derivatives couple readily to amino groups of proteins to give active conjugates. For example, the enzyme subtilisin (2 ml of a 2.37 mg/ml solution) was coupled to acryloyl-PEG-SPA (from Example 7) (MW 3400, 10 mg) by reaction in 2 ml of borate buffer (0.1 M, pH 8.0) for one hour at 4° C. The protein was purified by ultrafiltration with an Amicon PM 30 ultrafiltration membrane. Analysis with fluorescamine assay showed that two lysine groups had been modified by PEG attachment. Analysis on size exclusion chromatography (Toya Soda TSK 3000 column with pH 7 phosphate buffer eluent) showed that the molecular weight of the PEG-protein conjugate was approximately six thousand daltons greater than that of native protein. Exposure of the protein-PEG conjugate to a model substrate, the peptide PNA, gave rapid production of p-nitrophenol as shown by adsorbance at 402 nm, thus demonstrating that the protein-PEG conjugate has retained most of its catalytic activity.

In a similar experiment bovine alkaline phosphatase, MW 140,000, was coupled to methoxy-PEG-SPA, MW 5000, (from Example 1) by reaction of 20 mg of enzyme and 30 mg of the PEG in 2 ml of buffer containing 0.2 M sodium phosphate and 0.5 M NaCl (pH 7.5) at 4° C. for 30 minutes. Unreacted PEG was removed by ultrafiltration, as above. Fluorescamine analysis showed that 20% of the available lysines were modified. Analysis on size exclusion chromatography (Toya Soda TSK 3000 column with pH 7 phosphate buffer eluent) showed that the molecular weight of the PEG-protein conjugate was approximately 30 thousand daltons greater than that of native protein. Addition of p-nitrophenylphosphate, a substrate for the enzyme, showed rapid production of p-nitrophenol (absorbance at 402 nm), thus demonstrating that the protein-PEG conjugate has retained most of its catalytic activity.

Other water soluble polymers than PEG should be suitable for similar modification to create the structures of the invention that are suitable for biotechnical use. These other polymers include poly(vinyl alcohol) ("PVA"); other poly (alkylene oxides) such as poly(propylene glycol) ("PPG") and the like; and poly(oxyethylated polyols) such as poly (oxyethylated glycerol), poly(oxyethylated sorbitol), and poly(oxyethylated glucose), and the like. The polymers can be homopolymers or random or block copolymers and terpolymers based on the monomers of the above polymers, straight chain or branched, or substituted or unsubstituted similar to mPEG and other capped, monofunctional PEGs having a single active site available for attachment to a linker.

Specific examples of suitable additional polymers include poly(oxazoline), poly(acryloylmorpholine) ("PAcM") as described in published Italian Patent Application MI-92-A-0002616 filed Nov. 17, 1992, and poly(vinylpyrrolidone) ("PVP"). PVP and poly(oxazoline) are well known polymers in the art and their preparation and use in the syntheses described above for mPEG should be readily apparent to the skilled artisan.

The invention has been described with respect to several particular examples and embodiments. However, the foregoing examples and description are not intended to limit the invention to the exemplified embodiments, and the skilled artisan should recognize that variations can be made within the scope and spirit of the invention as described in the foregoing specification. The invention includes all alternatives, modifications, and equivalents that may be included within the true scope and spirit of the invention as defined by the appended claims.

What is claimed is:

1. An active ester of a polymer acid wherein said polymer acid has a single active ester, said active ester has a half life in water of from about 10 to 25 minutes at a pH of about 8 and at about 25 degrees Centigrade, and said active ester comprises a propionic or butanoic acid moiety attached to one of the terminae of a polymer moiety selected from the group consisting of poly(alkylene oxides), poly(oxyethylated polyols), poly(olefinic alcohols), and poly(acrylomorpholine), wherein said polymer moiety has about 44 or more recurring monomer units.

2. The active ester of claim 1 wherein said polymer moiety is poly(ethylene glycol).

3. The active ester of claim 2 wherein said poly(ethylene glycol) is represented by the general structure:

wherein n is from about 44 to 4000.

4. The active ester of claim 2 wherein said active ester has the structure:

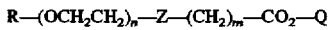

wherein n is from about 44 to 4000; Z is a moiety selected from the group consisting of —O—, —S—, —NHCO—, —CONH—, —NHCO$_2$—, and O$_2$CNH—; m is from 2 to 3; Q is selected from the group consisting of tert-butyl, N-succinimide, N-sulfosuccinimide, N-phthalimide, N-glutarimide, N-tetrahydrophthalimide, and N-norbornene-2,3-dicarboximide, hydroxybenzotriazole, and hydroxy-7-azabenzotriazole; and R is selected from the group consisting of hydrogen, alkyl, benzyl, aryl, acetal (CH$_3$CH$_2$O)$_2$—CH$_2$CH$_2$—O—, aldehyde OHC—CH$_2$CH$_2$—O—, alkenyl CH$_2$=CH—CH$_2$—, acrylate CH$_2$=CH—CO—, methacrylate CH$_2$=C(CH$_3$)—CO—, acrylamide CH$_2$=CH—CONH—CH$_2$CH$_2$—, active sulfone, amine H$_2$N—CH$_2$CH$_2$—, protected amine Y—NH—CH$_2$CH$_2$—, where Y is an amine protecting group, thiol HS—CH$_2$—CH$_2$, and protected thiol B—S—CH$_2$CH$_2$—, wherein B is a thiol protecting group.

5. The active ester of claim 4 wherein n is from about 44 to 2000.

6. The active ester of claim 4 wherein said amine protecting group is t-Boc and said thiol protecting group is orthopyridyldisulfide.

7. A compound having the following structure:

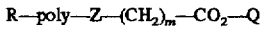

where poly represents a polymer moiety having about 44 or more recurring monomer units and said polymer moiety is selected from the group consisting of poly(alkylene oxides), poly (oxyethylated polyols), poly(olefinic alcohols), and poly(acrylomorpholine); Z is a hydrolytically stable group, wherein said hydrolytic stability is sufficient for the adjacent ester moiety to have a half life in water of from about 10 to 25 minutes at a pH of about 8 and at about 25 degrees Centigrade; m is from 2 to 3; Q is selected from the group consisting of tert-butyl, N-succinimide, N-sulfosuccinimide, N-phthalimide, N-glutarimide, N-tetrahydrophthalimide, and N-norbornene-2,3-dicarboximide, hydroxybenzotriazole, and hydroxy-7-azabenzotriazole; and R is selected from the group consisting of hydrogen, alkyl, benzyl, aryl, acetal (CH$_3$CH$_2$O)$_2$—CH$_2$CH$_2$—O—, aldehyde OHC—CH$_2$CH$_2$—O—, alkenyl CH$_2$=CH—CH$_2$—, acrylate CH$_2$=CH—CO—, methacrylate CH$_2$=C(CH$_3$)—CO—, acrylamide CH$_2$=CH—CONH—CH$_2$CH$_2$—, active sulfone, amine H$_2$N—CH$_2$CH$_2$—, protected amine Y—NH—CH$_2$CH$_2$—, where Y is an amine protecting group, thiol HS—CH$_2$—CH$_2$, and protected thiol B—S—CH$_2$CH$_2$—, wherein B is a thiol protecting group.

8. A compound according to claim 7 wherein Z is selected from the group consisting of —O—, —S—, —NHCO—, —CONH—, —NHCO$_2$—, and —O$_2$CNH—.

9. A compound according to claim 7 wherein the amine protecting group Y is t-BOC and said thiol protecting group B is orthopyridyldisulfide.

10. A compound according to claim 7 wherein poly represents a polymer selected from the group consisting of poly(ethylene glycol), poly(propylene glycol), poly(oxyethylated glycerol), poly(oxyethylated sorbitol), poly(oxyethylated glucose), poly(vinyl alcohol), and poly(acrylomorpholine).

11. A compound according to claim 7 wherein the polymer backbone of said polymer moiety is substantially straight chain and unsubstituted except for the terminae.

12. A compound according to claim 7 wherein the polymer backbone of said polymer moiety is a random or block copolymer or terpolymer.

13. A compound having the structure

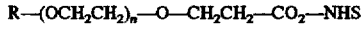

wherein n is from about 44 to 4000 and R is selected from the group consisting of hydrogen, alkyl, benzyl, aryl, acetal (CH$_3$CH$_2$O)$_2$—CH$_2$CH$_2$—O—, aldehyde OHC—CH$_2$CH$_2$—O—, alkenyl CH$_2$=CH—CH$_2$—, acrylate CH$_2$=CH—CO—, methacrylate CH$_2$=C(CH$_3$)—CO—, acrylamide CH$_2$=CH—CONH—CH$_2$CH$_2$—, active sulfone, amine H$_2$N—CH$_2$CH$_2$—, protected amine Y—NH—CH$_2$CH$_2$—, where Y is an amine protecting group, thiol HS—CH$_2$—CH$_2$, and protected thiol B—S—CH$_2$CH$_2$—, wherein B is a thiol protecting group.

14. The compound of claim 13 wherein n is from about 44 to 2000.

15. A compound having the structure CH$_3$O—PEG—O—CH$_2$—CH$_2$—CO$_2$—NHS wherein PEG is polyethylene glycol having from about 44 to 4000 recurring monomer units.

16. A compound having the structure CH$_3$O—PEG—O—CH$_2$CH$_2$—CONH—PRO, wherein the moiety —NH—PRO represents an amino site on a biologically active molecule.

17. A water soluble and isolatable conjugate of an active ester of a polymer acid as claimed in claim 1 and at least one biologically active molecule or a surface.

18. A conjugate according to claim 17 wherein the at least one biologically active molecule is selected from the group consisting of proteins, enzymes, polypeptides, drugs, dyes, nucleosides, oligonucleotides, lipids, phospholipids, and liposomes.

19. A conjugate according to claim 17 wherein the compound serves to tether a biologically active molecule to another biologically active molecule, which may be the same or different, or to tether a biologically active molecule to a surface.

20. A water soluble and isolatable conjugate of a compound as claimed in claim 7 and at least one biologically active molecule or a surface.

21. A conjugate according to claim 20 wherein the at least one biologically active molecule is selected from the group consisting of proteins, enzymes, polypeptides, drugs, dyes, nucleosides, oligonucleotides, lipids, phospholipids, and liposomes.

22. A conjugate according to claim 20 wherein the compound serves to tether a biologically active molecule to another biologically active molecule, which may be the same or different, or to tether a biologically active molecule to a surface.

23. A water soluble and isolatable conjugate of a compound as claimed in claim 15 and at least one biologically active molecule or a surface.

24. A conjugate according to claim 23 wherein the at least one biologically active molecule is selected from the group consisting of proteins, enzymes, polypeptides, drugs, dyes, nucleosides, oligonucleotides, lipids, phospholipids, and liposomes.

25. A conjugate according to claim 23 wherein the compound serves to tether a biologically active molecule to another biologically active molecule, which may be the same or different, or to tether a biologically active molecule to a surface.

* * * * *

UNITED STATES PATENT AND TRADEMARK OFFICE
CERTIFICATE OF CORRECTION

PATENT NO. : 5,672,662
DATED : September 30, 1997
INVENTOR(S) : Harris et al.

It is certified that error appears in the above-identified patent and that said Letters Patent is hereby corrected as shown below:

Column 5, line 3, "HO-$(CH_2CH_2O)_n$-$CH_2CH_2O)$" should be -- HO-$(CH_2CH_2O)_n$-$CH_2CH_2$ --.

Column 5, line 4, "$_n$-$NHCOCH_2CH_2CO_2C(CH_3)_3$" should be -- $NHCOCH_2CH_2CO_2C(CH_3)_3$ --.

Column 5, line 53, "$CH_2$" both occurrences, should be -- $\underline{C}H_2$ --.

Column 5, line 65, "$CH_2$" should be -- $\underline{C}H_2$ --.

Column 6, line 8, "$CH_2$" should be -- $\underline{C}H_2$ --.

Column 6, line 24, after "C" delete the period.

Column 6, line 30, "$SCH_2CH_2$" should be -- $S\underline{CH_2CH_2}$ --.

Column 6, line 32, "OH" should be -- O$\underline{H}$ --.

Column 7, line 15, "$CH_2$" should be -- $\underline{C}H_2$ --.

Column 7, line 16, "$OCH_2$' (2nd. occ.) should be -- O$\underline{C}H_2$ --.

Column 7, line 26, "$CH_2CH_2CH$" should be -- $CH_2\underline{C}H_2CH$ --.

Column 7, line 27, "$CH_2CH$" should be -- $CH_2\underline{C}H$ --.

UNITED STATES PATENT AND TRADEMARK OFFICE
CERTIFICATE OF CORRECTION

PATENT NO. : 5,672,662
DATED : September 30, 1997
INVENTOR(S) : Harris et al.

It is certified that error appears in the above-identified patent and that said Letters Patent is hereby corrected as shown below:

Column 7, line 36, "$CH_2CH_2CH_2$" should be -- $CH_2\underline{CH_2}CH_2$ --.

Column 7, line 37, "$CH_2CH_2CH_2$" should be --$CH_2CH_2\underline{CH_2}$--

Column 7, line 49, "$CH_2CH_2CH_2$" should be -- $CH_2\underline{CH_2}CH_2$ --.

Column 9, line 26, "Was" should be -- was --.

Column 9, line 30, "OH" should be -- O$\underline{H}$ --.

Column 9, line 35, "$CH_2=CH-CO_2-(CH_2,CH_2O)_nCH_2CH_2S$" should be -- $CH_2=CH-CO_2-(CH_2CH_2O)_nCH_2CH_2S$ --.

Column 9, line 39, "saptum" should be -- septum --.

Column 9, line 57, "$SCH_2CH_2$" should be -- $S\underline{CH_2}CH_2$ --.

Column 9, line 59, "CHaHbCHcCOO" should be -- C$\underline{Ha}$HbCHcCOO --.

Column 9, line 59, "CHaHbCHcCOO", second occurrence, should be -- CHaHbC$\underline{Hc}$COO --.

Column 9, line 60, "CHaHbCHcCOO" should be -- CHa$\underline{Hb}$CHcCOO --.

Column 10, line 4, "$SCH_2CH_2$" should be -- $S\underline{CH_2}CH_2$ --.

Column 10, line 5, "CHaHbCHcCoo" should be -- C$\underline{Ha}$HbCHcCoo --.

UNITED STATES PATENT AND TRADEMARK OFFICE
CERTIFICATE OF CORRECTION

PATENT NO. : 5,672,662
DATED : September 30, 1997
INVENTOR(S) : Harris et al.

It is certified that error appears in the above-identified patent and that said Letters Patent is hereby corrected as shown below:

Column 10, line 6, "CHaHbCHcCOO" should be
-- CHaHb<u>CHc</u>Coo --.

Column 10, line 7, "CHaHbCHcCOO" should be
-- CHa<u>Hb</u>CHcCoo --.

Column 11, line 14, "CHCH$_2$O" should be    -- <u>CHCH$_2$O</u> --.

Column 11, line 15, "CHaHb" should be -- <u>CHaHb</u> --.

Column 11, line 16, "CHaHb=CHcCH$_2$O" should be
-- CHa<u>Hb=</u>CHcCH$_2$O --.

Column 11, line 27, after "day" delete "I".

Column 11, line 32, "CH$_2$CHCH$_2$O" should be -- CH$_2$CH<u>CH</u>$_2$O --.

Column 11, line 33, "CHaHbCHcCH$_2$O" should be
-- C<u>Ha</u>HbCHcCH$_2$O --.

Column 11, line 34, "CHaHbCHcCH$_2$O" should be
-- CHa<u>Hb</u>CHcCH$_2$O --.

Column 12, line 37, "-CH$_2$NH$_2$HCl" should be
-- <u>-CH$_2$</u>NH$_2$HCl --.

Column 12, line 59, "CH$_2$" should be -- <u>CH</u>$_2$ --.

Column 13, line 30, "CH$_2$" should be -- <u>CH</u>$_2$ --.

Column 13, line 54, "NHCH$_2$CH$_2$O" should be -- NH<u>CH</u>$_2$CH$_2$O --.

UNITED STATES PATENT AND TRADEMARK OFFICE
CERTIFICATE OF CORRECTION

PATENT NO. : 5,672,662
DATED : September 30, 1997
INVENTOR(S) : Harris et al.

It is certified that error appears in the above-identified patent and that said Letters Patent is hereby corrected as shown below:

Column 14, line 38, "$CH_3$" should be -- $\underline{CH}_3$ --.

Column 14, line 39, "$(CH_2)_{12}$" should be -- $\underline{(CH_2)}_{12}$ --.

Column 14, line 41, "$CH_2NH$" should be -- $\underline{CH}_2NH$ --.

Column 14, line 43, "$CH_2CH_2O$" should be -- $CH_2\underline{CH}_2O$ --.

Column 14, line 66, "hr." should be -- nr. --.

Column 15, line 3, "$CH_3$" should be -- $\underline{CH}_3$ --.

Column 15, line 4, "$(CH_2)_{14}$" should be -- $\underline{(CH_2)}_{14}$ --.

Column 15, line 6, "$CH_2NH$" should be -- $\underline{CH}_2NH$ --.

Column 15, line 8, "$CH_2CH_2O$" should be -- $CH_2\underline{CH}_2O$ --.

Column 16, line 34, After "C" delete the period.

Signed and Sealed this

Twenty-seventh Day of January, 1998

Attest:

BRUCE LEHMAN

Attesting Officer

Commissioner of Patents and Trademarks